US009648000B2

(12) United States Patent
Chen et al.

(10) Patent No.: US 9,648,000 B2
(45) Date of Patent: May 9, 2017

(54) AUTHENTICATING A DEVICE WHEN CONNECTING IT TO A SERVICE

(71) Applicant: Telefonaktiebolaget L M Ericsson (publ), Stockholm (SE)

(72) Inventors: Colin Chen, Guangzhou (CN); Robert Skog, Hasselby (SE); James Tong, Guangzhou (CN); Wenzheng Zhu, Guangzhou (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 26 days.

(21) Appl. No.: 14/442,766

(22) PCT Filed: Nov. 14, 2012

(86) PCT No.: PCT/CN2012/084576
§ 371 (c)(1),
(2) Date: May 14, 2015

(87) PCT Pub. No.: WO2014/075234
PCT Pub. Date: May 22, 2014

(65) Prior Publication Data
US 2015/0312234 A1    Oct. 29, 2015

(51) Int. Cl.
*G06F 21/00* (2013.01)
*H04L 29/06* (2006.01)
(Continued)

(52) U.S. Cl.
CPC .............. *H04L 63/08* (2013.01); *H04L 67/10* (2013.01); *H04W 12/06* (2013.01)

(58) Field of Classification Search
CPC ............................. H04L 9/3247; H04L 63/08
See application file for complete search history.

(56) References Cited

U.S. PATENT DOCUMENTS

| 8,126,145 B1 | 2/2012 | Tewari et al. |
| 8,156,543 B2 * | 4/2012 | Wentker ................. G06F 21/33 713/168 |

(Continued)

FOREIGN PATENT DOCUMENTS

| CN | 101420492 A | 4/2009 |
| CN | 102447598 A | 5/2012 |
| WO | 2012055425 A1 | 5/2012 |

OTHER PUBLICATIONS

Kobsa, A. et al., "Serial Hook-ups: A Comparative Usability Study of Secure Device Pairing Methods", Proceedings of the 5th Symposium on Usable Privacy and Security, SOUPS '09, Jan. 1, 2009, p. 1, 12 pages, XP055194285.

(Continued)

*Primary Examiner* — Morshed Mehedi
(74) *Attorney, Agent, or Firm* — Rothwell, Figg, Ernst & Manbeck, P.C.

(57) ABSTRACT

There is provided a method and apparatus for authenticating user equipment access to a device over a communications network. The method comprises: sending a first message to the user equipment, the first message requesting the user to power off the device; detecting that the device is not available; sending a second message to the user equipment, the second message requesting that the user power on the device; detecting that the device is available; and if both detections are positive, then authenticating user equipment access to the device.

15 Claims, 7 Drawing Sheets

(51) Int. Cl.
*H04L 29/08* (2006.01)
*H04W 12/06* (2009.01)

(56) References Cited

U.S. PATENT DOCUMENTS

| | | | |
|---|---|---|---|
| 8,533,507 B2 * | 9/2013 | Vandwalle | H04W 8/005 370/311 |
| 2010/0207461 A1 * | 8/2010 | Chang | G06F 13/385 307/125 |
| 2011/0125601 A1 * | 5/2011 | Carpenter | G06Q 30/06 705/26.1 |
| 2011/0258303 A1 * | 10/2011 | Nath | G06F 9/468 709/223 |

OTHER PUBLICATIONS

Extended European Search Report dated May 20, 2016 issued in corresponding European Application No. 12888239.6, 9 pages.

\* cited by examiner

AUTHENTICATING A DEVICE WHEN CONNECTING IT TO A SERVICE

CROSS-REFERENCE TO RELATED APPLICATION

This application is a 35 U.S.C. §371 National Phase Entry Application from PCT/CN2012/084576, filed Nov. 14, 2012, and designating the United States.

TECHNICAL FIELD

The present application relates to a method for authenticating user equipment access to a device over a communications network, a server for authenticating user equipment access to a device, and a computer-readable medium.

BACKGROUND

In recent times there has been a trend for mobile devices to have the capability to connect to an internet service. For example, a digital camera can connect via WiFi™ to the internet and access a service such as Facebook™ to share the photos it contains with a user's friends. A GPS logger can upload a user's running log and share this with other users on a service such as Endomondo™.

It is broadly expected that in the near future, as well as sharing device data over an internet service, a user will be able to share access to his device with other users of the internet service. At least one system giving this facility has been disclosed (e.g. US 2011/0258303 discussed further below.

Figure 1:
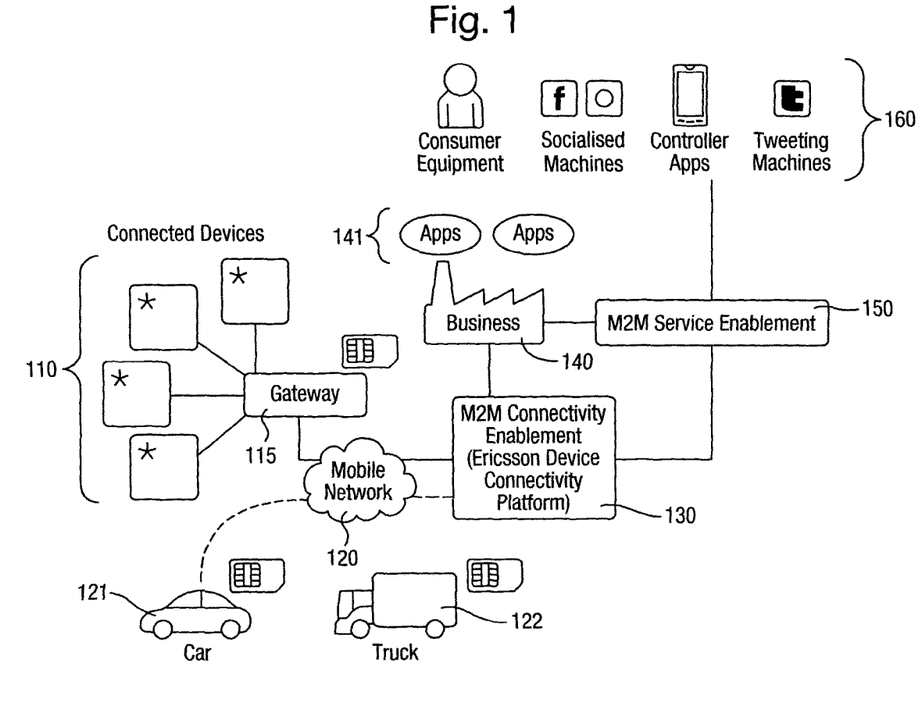
FIG. 1 illustrates a service platform that facilitates the sharing of access to connected devices.

FIG. 1 illustrates a service platform that facilitates the sharing of access to connected devices. A plurality of connected devices 110 communicate with a mobile network 120 via a gateway 115. In this case it is envisaged that connected devices 110 are small and/or have limited capabilities and as such they do not have a mobile network interface built in but need to communicate with a local gateway 115. The local gateway 115 relays the connection to mobile network 120. Alternative "devices" are also illustrated in the form of a car 121 and a truck 122. Here, it is envisaged that the car 121 and truck 122 would have mobile network connectivity built in as illustrated by the image of a SIM card next to them. Mobile network 120 allows the devices to connect to an M2M connectivity enablement module 130.

M2M (machine-to-machine) connectivity enablement module 130 may communicate with at least one business 140 which makes applications 141 available to users. Further, M2M connectivity module 130 may communicate with an M2M service enablement module 150 to allow the connected devices to be accessed by user equipments 160. The user equipments 160 may comprise tweeting machines, controller apps, socialized machines, and consumer equipment.

Figure 2:
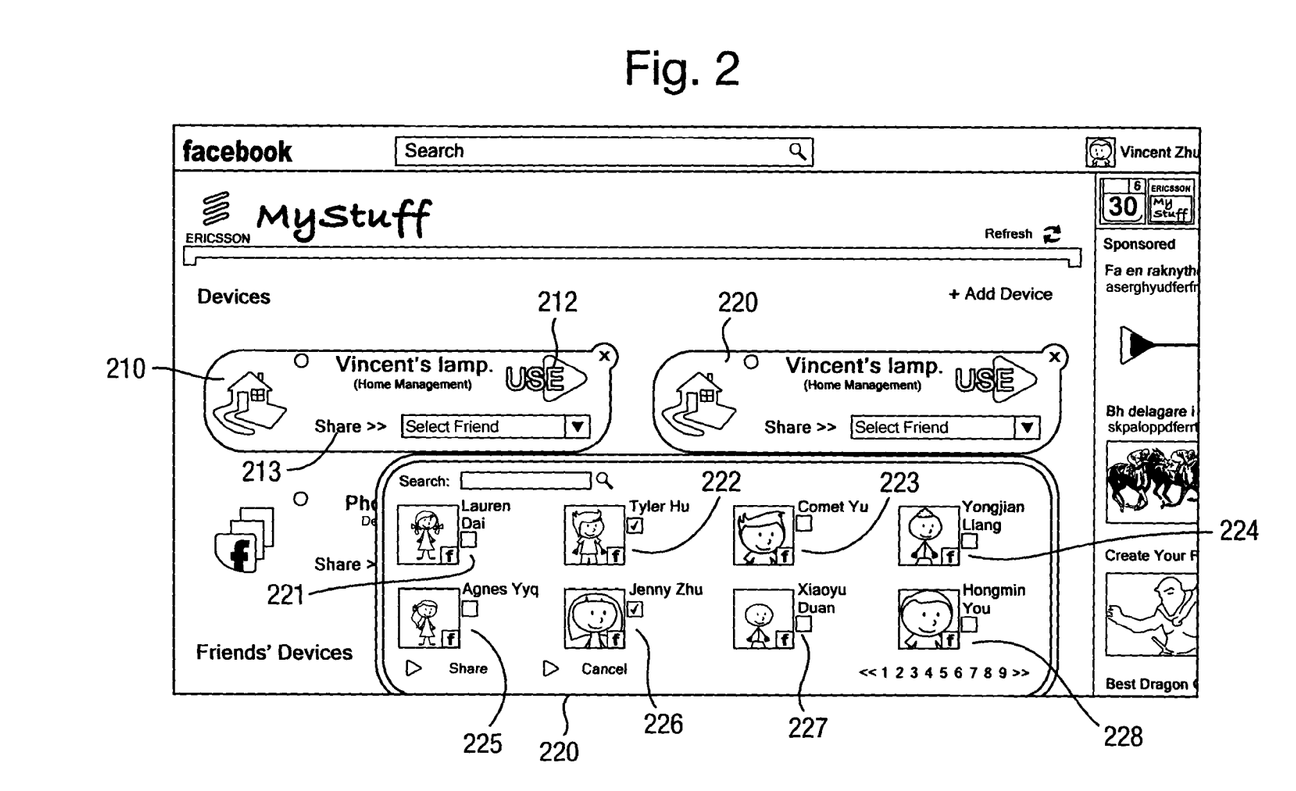
FIG. 2 shows a screenshot of a Facebook™ application called My Stuff.

FIG. 2 shows a screenshot of a Facebook™ application called My Stuff. Of particular note on the screenshot are screen areas 210 and 220 which relate to Vincent's Lamp 1 and Vincent's Lamp 2 respectively. Vincent's Lamps 1 and 2 are accessible to the user (Vincent) via his home management system. Vincent may select to use, for example, Vincent's Lamp 1 via the "use" button 212. A further screen area 213 is provided to allow Vincent to share access to Vincent's Lamp 1 with one or more of his friends. Selecting screen area 213 brings up an option box 220 listing a plurality of the user's friends 221, 222, . . . , 228 and provides the user with a tick box option for each in order to select whether or not each user may have access to Vincent's Lamp 1. Once a user's friend is given access to the device, they can also access the device the same way that Vincent can with the "use" button 212. In this way a user can share access to a device, such as the lamp in the example above.

Figure 3:
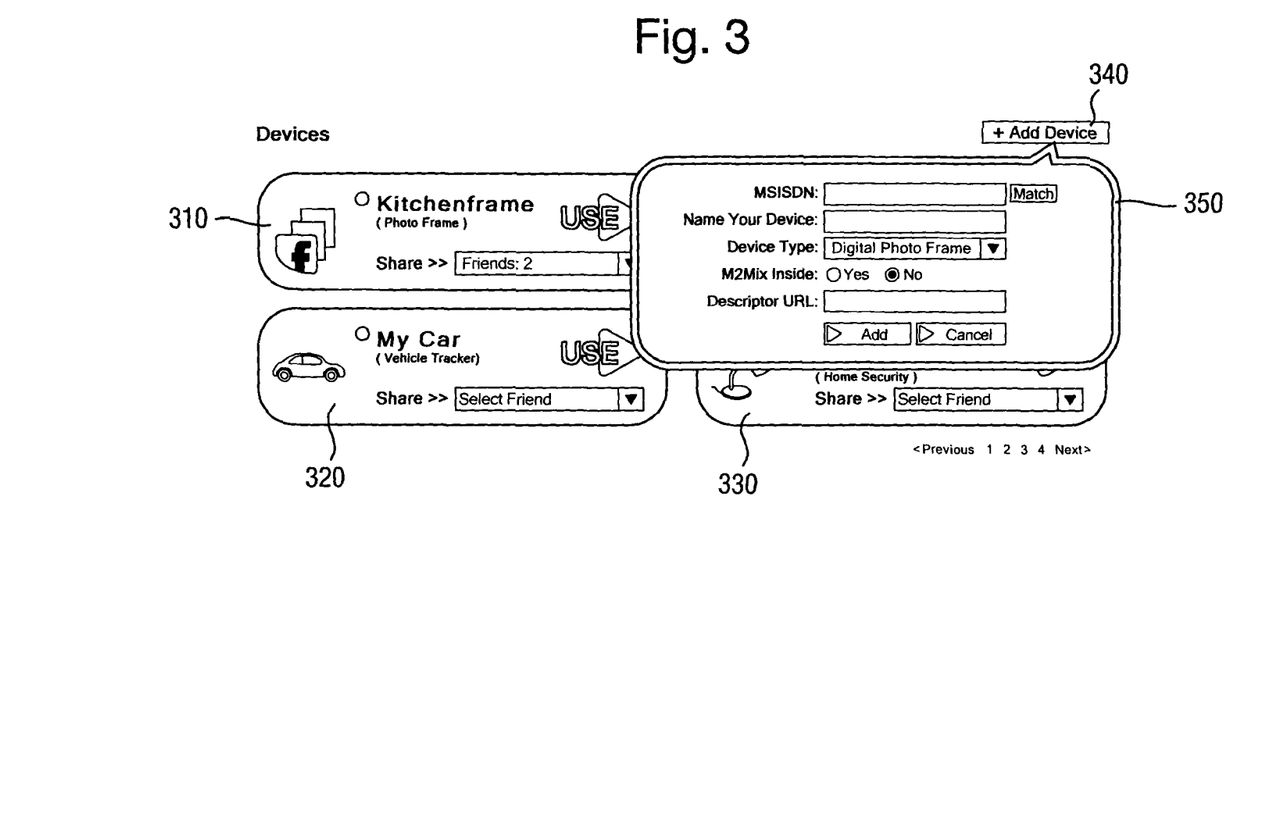
FIG. 3 shows a screenshot of a user interface for allowing a device to be added to the My Stuff application.

Prior to sharing access to a connected device via an online service such as Facebook™, the connected device must be registered with the online service. FIG. 3 shows a screenshot of a user interface for allowing a device to be added to the My Stuff application. Here, a plurality of devices is shown: a photo frame 310; a vehicle tracker 320; and a lamp 330. Upon selection of an add device screen area 340, labeled "Add Device", a dialogue box 350 is shown. Dialogue box 350 requests that the user input information relating to the device to allow it to be added to the My Stuff application. This requires each device to have a pre-assigned unique identity which is unique to the device. In the example shown, the unique identity is the MSISDN which is a number which uniquely identifies a subscription in a GSM or UMTS mobile network. The MSISDN can only be used as the unique identifier of a device if it connects via a wireless communications network.

Figure 4:
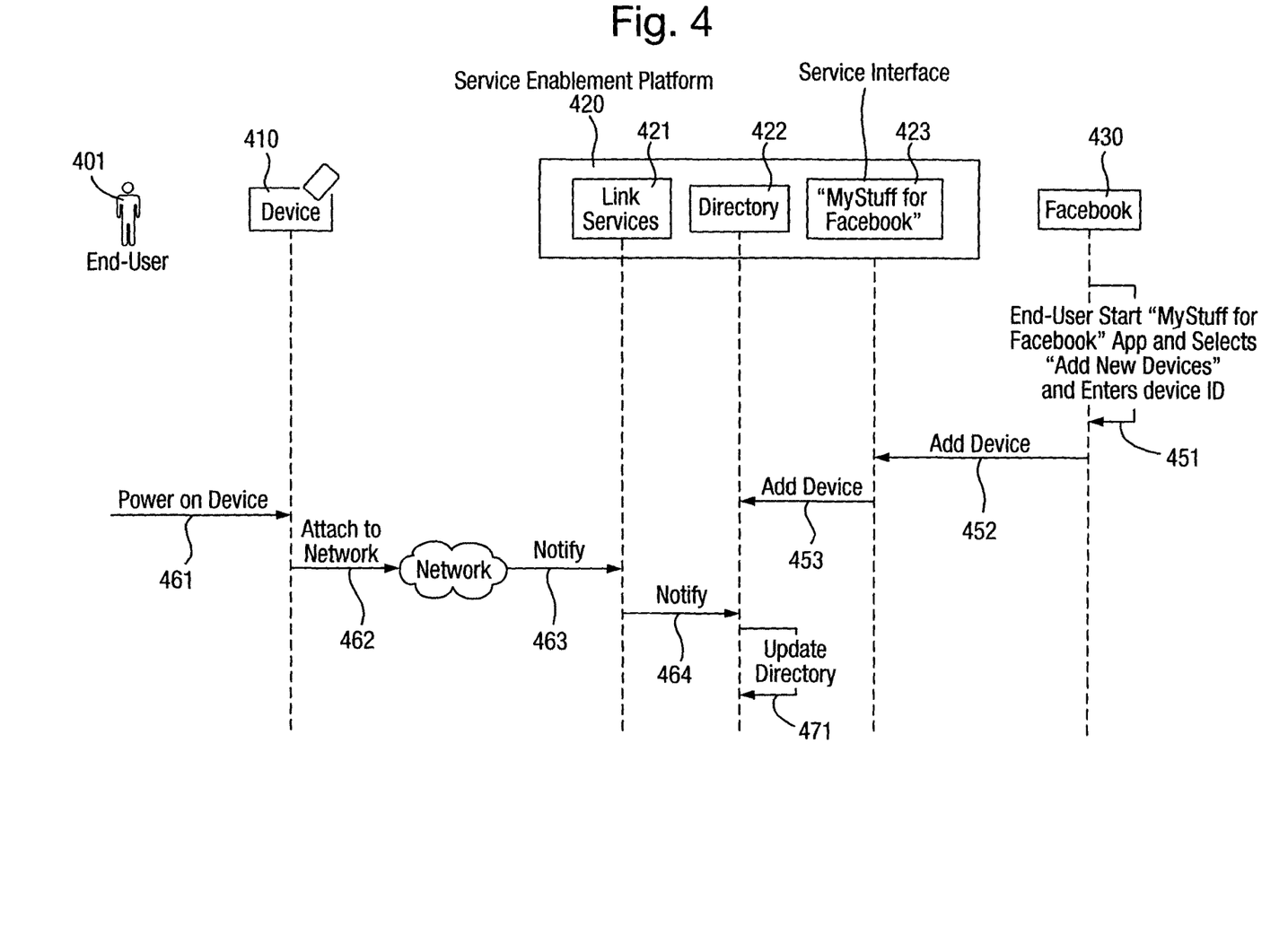
FIG. 4 is a messaging diagram illustrating the process for adding a device to the My Stuff application or service.

FIG. 4 is a messaging diagram illustrating the process for adding a device to the My Stuff application or service. In this example a user 401 has a device 410, which in this case includes a SIM card, and the user 401 has an account with a service 430 which in this case is Facebook™. The machine-to-machine (M2M) interface is provided by a service enablement platform 420. Service enablement platform 420 comprises a link service 421 arranged to receive communications from connectable devices, such as device 410. Service enablement platform 420 further comprises a service interface 423, which in the case provides an interface towards "My Stuff for Facebook" 423. Service enablement platform 420 further comprises a Directory 422 which keeps a directory matching devices 410 to user accounts on the service 430.

The process starts at 451 where end user 401 logs on to the Facebook™ service 430 and, using the My Stuff for Facebook application, he selects 'add new device' as, for example, illustrated in FIG. 3. In step 451 end user 401 enters the MSISDN currently used by device 420. Next, at 452 an add device message is sent from service 430 to the service interface 423 which at 453 registers the device with the directory 422.

At the device 410 side, end user 401 powers on 461 the device 410 which in turn at 462 connects to the communications network. Once connected to the communications network, the device sends a notify message 463 to the link service 421 in the service enablement platform 420. The link service 421 then sends a notifying message 464 to the directory 422. Messages 462, 463 and 464 away from the device 410 include the MSISDN of the device 410. At 471 the directory 422 correlates the MSISDN input at 451 with the MSISDN used by device 410 to attach to the network at 462. The stored information in Directory 422 is updated to reflect the connection between end user 401, his account on service 430, and the device 410.

For relatively large devices such as cars, it is reasonable to expect that each will have a SIM card loaded therein to facilitate communication via a wireless communications network, and as such each car will have an MSISDN circulated therewith. However, this is less reasonable for smaller devices such as temperature sensors which can be expected to be deployed in far greater numbers than cars. Indeed, this is particularly pertinent where a plurality of devices connect to a wireless communications network via a common gateway. Furthermore, the MSISDN is not confidential information, and so it is possible for a third party to obtain the MSISDN of a connected device and so control and share access to a connected device which is not theirs.

Accordingly there is required a method for authenticating a device when connecting it to a service.

US Patent Application Publication US2011/0258303 describes a system and method for personal device sharing using social networks. This document describes a system wherein a first user has a first personal device and a second user has a second personal device. The first user sends a request for sharing access to a resource or a state of a second personal device and whether to grant sharing access is determined, at least in part, upon the nature of the online social network relationship between the first user and the second user.

SUMMARY

There is provided a method for authenticating user equipment access to a device over a communications network. The method comprises sending a first message to the user equipment, the first message requesting the user to power off the device. The method further comprises detecting that the device is not available, and sending a second message to the user equipment, the second message requesting that the user power on the device. The method further still comprises detecting that the device is available. If both detections are positive, then the method comprises authenticating user equipment access to the device.

This method establishes whether a user of user equipment has control of a device, and determines that if they do have control of the device then they are allowed to access the device via their user equipment and the communications network. This is particularly useful for, but not limited to, a device where the only output from the device is via the communications network, and the only control input is a power switch, or even a power connection that can be disconnected.

The method may be performed in a server, the server arranged to communicate with the communications network. The server may provide a service to the user, via the user equipment.

User equipment access to the device may comprise allowing the user equipment to access the device hardware. The device hardware may comprise at least sensor, at least one processor and/or memory.

The method may further comprise authenticating a user account, and authenticating the user account access to the device. The user account may be authenticated by a username and password.

The first message may request that the user power off the device within a first time period. Similarly, the second message may request that the user power on the device within a second time period. The method may further comprise waiting for the first and/or second time period to expire before performing the respective detecting. The first and second time periods may be the same or different. Applying a time limit to the interval for powering on and/or off reduces the likelihood of a random powering on and/or off giving a false positive detection.

There is further provided a server for authenticating user equipment access to a device, the server comprising a processor and at least one communication port. The processor is arranged to send and receive communications via the at least one communication port. The processor is further arranged to send a first message to the user equipment, the first message requesting the user to power off the device. The processor is also arranged to detect that the device is not available. The processor is further arranged to send a second message to the user equipment, the second message requesting that the user power on the device; the processor arranged to detect that the device is available. If both detections are positive, then the processor is further arranged to authenticate the user equipment access to the device.

The server can thus establish whether a user of user equipment has control of a device, and may determine that if they do have control of the device then they are allowed to access the device via their user equipment and the communications network. This is particularly useful for, but not limited to, a device where the only output from the device is via the communications network, and the only control input is a power switch, or even a power connection that can be disconnected.

The server may be arranged to communicate with the communications network via the at least one communications port. The server may be arranged to provide a service to the user equipment.

The service may comprise retrieving information from the device and delivering the information, or a derivative of the information, to the user equipment. The device hardware may comprise at least sensor, at least one processor and/or memory. The server may be arranged to communicate with a plurality of devices. The server may be arranged to communicate with a plurality of user equipments. The server may be arranged to communicate with a plurality of users.

The server may host at least one user account, the at least one user account accessible by a user via a user equipment. The server may further authenticate a user account, and allow the user account access to the authenticated device. The user account may be authenticated by a username and password. The user account may be authenticated using a one-time password generator.

The server may further comprise a memory to store a record of an authenticated link between the user equipment and the device. The memory may further store a record of an authenticated relationship with a user account.

The server may further comprise a timer, the timer used to determine whether the device is powered on or off within a particular time period.

There is further provided a computer-readable medium, carrying instructions, which, when executed by computer logic, causes said computer logic to carry out any of the methods defined herein.

There is further still provided a computer-readable storage medium, storing instructions, which, when executed by computer logic, causes said computer logic to carry out any of the methods defined herein. The computer program product may be in the form of a non-volatile memory or volatile memory, e.g. an EEPROM (Electrically Erasable Programmable Read-only Memory), a flash memory, a disk drive or a RAM (Random-access memory).

BRIEF DESCRIPTION OF THE DRAWINGS

A method and apparatus for authenticating a device when connecting it to a service will now be described, by way of example only, with reference to the accompanying drawings, in which.

DETAILED DESCRIPTION

Although it is known to share a device using an online service such as a social network, there is no solution or patent for authenticating the device to connect to a social network or other internet services. Such an authentication process is presented herein.

There are numerous considerations in the establishment of a process to authenticate a device connection to an internet service. For example, there are many different types of device; each type of device may be given a series of unique identifiers, but it will be difficult if not impossible to ensure that any particular device has an identifier that is unique amongst all types of device. Furthermore, there is no guarantee that the unique identifier has not fallen into the hands of a third party that should not have administrator access to the device.

The object of this invention is to provide an authentication mechanism that the device is first-time connected to internet service in a safe way.

When the device is first-time attached to an internet service; or the user adds the device to the internet service for the first-time, the authentication mechanism should verify that the user trying to connect the device to the service is the rightful owner of the device. This authentication mechanism can reduce misuse by making it harder for a third party to steal access to a device, and also helping legitimate users to ensure they are connecting to the service the device they mean to.

The authentication process described herein establishes whether a user of user equipment has control of a device, and determines that if they do have control of the device then they are allowed to connect the device to the communications network. This is particularly useful for, but not limited to, a device where the only output from the device is via the communications network, and the only control input is a power switch, or even a power connection that can be disconnected.

Although a device owner may intend to share access to a device with users of an internet service, it is important that the device owner can choose with whom to share access to the device. This is perhaps less important if the device is a temperature sensor, but a device owner will want reassurance that his connected lamps or security cameras cannot be accessed by third parties not selected by him. In other words, only a device owner should have administrator access to the device, even if the device owner intends to share user access to the device with his friends.

Figure 5:
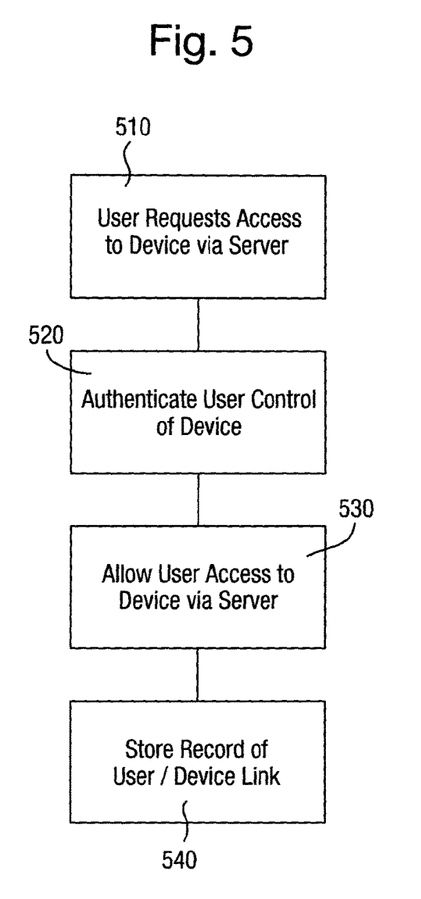
FIG. 5 illustrates a generic process for adding a device to a service hosted by a server.

FIG. 5 illustrates a generic process for adding a device to a service hosted by a server. At 510 a user requests to access the device via the server. The user typically requests access via a user equipment arranged to communicate with the server via the internet. At 520 the server authenticates user control of the device; this process is described in more detail below. Once user control of the device is authenticated at 520 the process moves to 530 where the user is allowed to access the device via the server. Then, at 540 a record of the user/device link is stored for future reference. The stored record of the link between the user account and the device allows the server to give a user access to a device if it has been previously authenticated.

Figure 6:
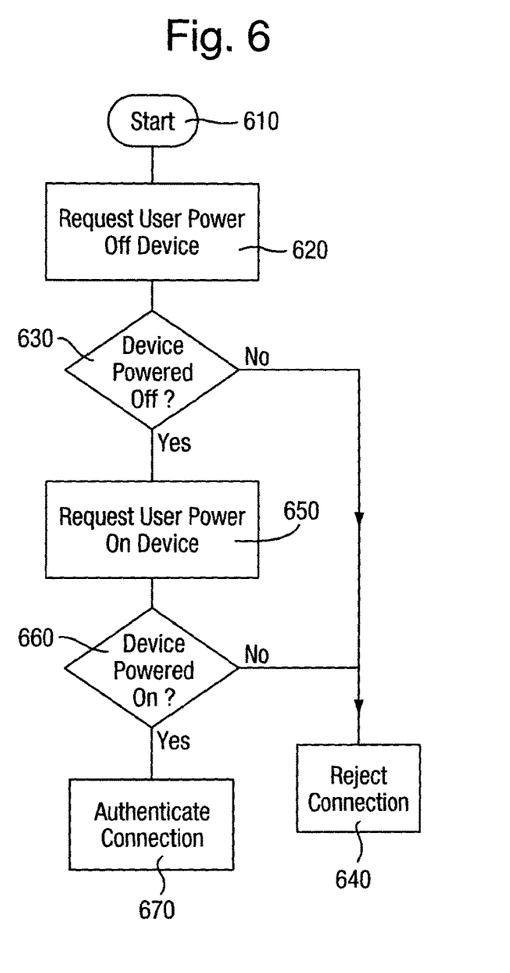
FIG. 6 illustrates a method for authenticating user control of a device.

FIG. 6 illustrates a method for authenticating user control of a device. This process presumes that the device the user wishes to connect to via the online service is in the user's control such that the user can power on and power off the device at will. This means that the user either has physical access to the device to the extent that he can control whether or not the device has power, or the user has access to some other remote control system which allows him to control the device. That control may extend to being able to power on and power off the device remotely, or may be the ability to make the device appear to be powered off, perhaps by preventing the device from sending messages.

The process starts at 610. At 620 the server requests that the user power off the device. At 630 the server makes a determination as to whether the device has been powered off. If the device has not been powered off, then it is determined that the user does not have access to the device, or that the user is trying to access the wrong device, and the connection is rejected at 640.

If the determination at 630 is positive and the device has been powered off, then process proceeds to 650 and the server request that the user power on the device. At 660 a determination is made as to whether the device is powered on. If the device has not been powered on, then it is determined that the user does not have access to the device and the connection is rejected at 640. In such an instance it must have been merely coincidence that the device was powered off when requested at 620.

If the determination at 660 is positive and the device has been powered off, then the process proceeds to 670 and the connection between the user (or the user account) and the device is authenticated.

Figure 7:
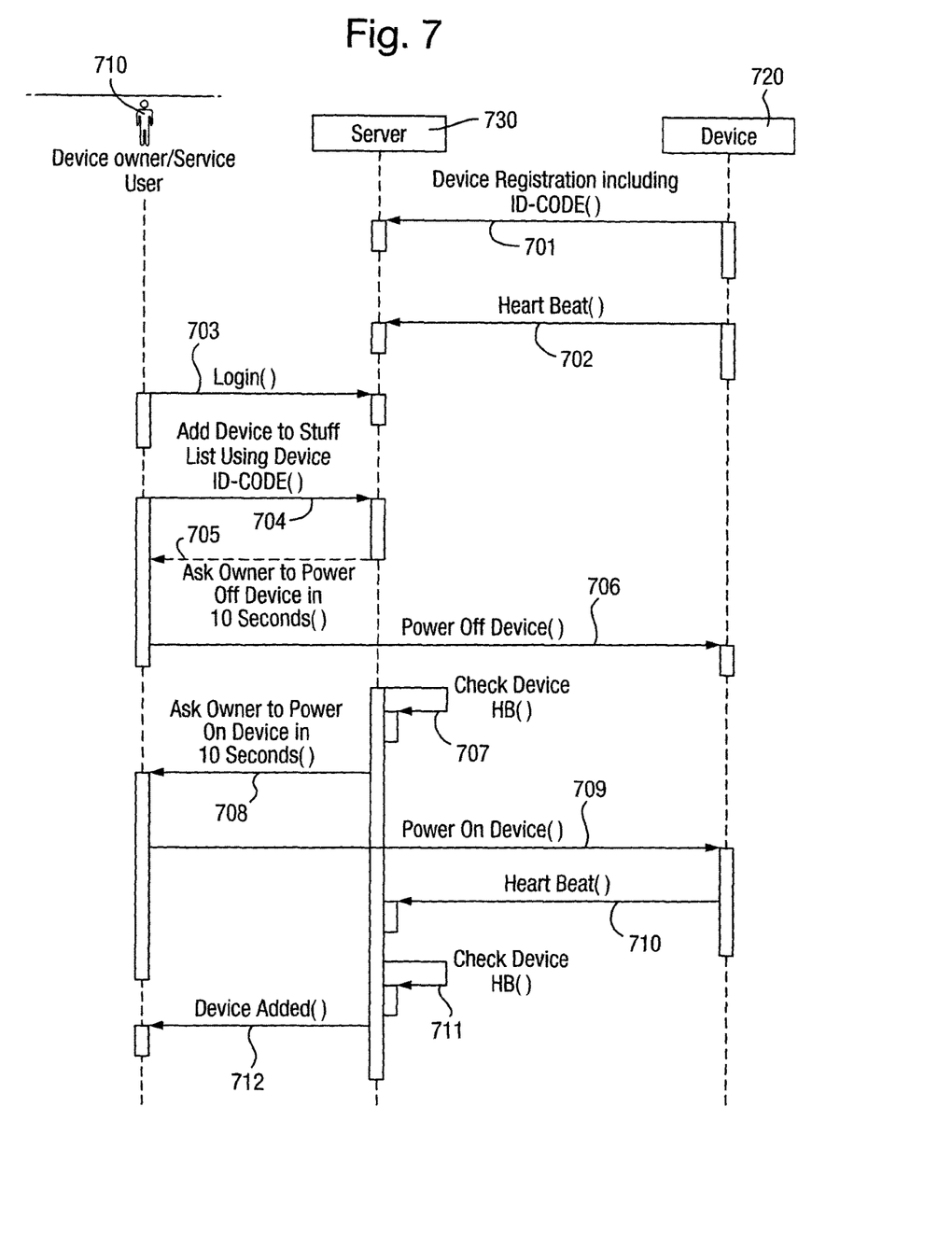
FIG. 7 is a messaging diagram illustrating the authentication process described herein.

FIG. 7 is a messaging diagram illustrating the authentication process described herein. The authentication process takes place between a service user and device owner 710, a device 720, and a server 730 hosting a service such as My Stuff. Device 720 initially registers with the server 730 by sending a device registration message 701 to the server hosting server 730. Device registration message 701 includes an ID code which identifies the device. The ID code may be unique identifier for the device 720; the ID code may be a unique code in a particular sequence of identifying codes, with no guarantee the same code is not reused in another sequence of identifying codes. The ID code may identify a subset of devices, with the authentication method herein used to both check the service user is also the device owner, and to identify the particular device the service user intends to connect to out of the subset of devices.

Device 720 then continues to send heartbeat messages 702 to the server 730. The heartbeat message 702 enables the server 730 to identify if and when the device 720 is switched off or is no longer available. Device 720 is arranged to send periodic heartbeat messages 702. The device owner 710 then logs in to the service provided by the server 730 using a user interface which results in the generation of a login message 703 being sent from the user equipment used by the device owner 710 to access the service hosted by the server 730. Furthermore, using the user interface of the user equipment, the device owner initiates an add device process which requires the device owner 710 to input the ID code of device 720. The add device process results in an 'add device to stuff' list message 704 which includes the ID code of device 720 and is sent from the device owner's user equipment to server 730. In response to the 'add device to stuff' list message 704, the server 730 issues a request 705 asking the device owner to power off device 720 within a predetermined time period, in this case 10 seconds. The device owner 710 then powers off the device 720 via an action or message 706. Device owner 710 may be able to power off device 720 via some control message or merely by the act of switching off or disconnecting a power supply to device 720. Server 730 then makes a determination 707 as to whether the device 720 has been powered off by checking for a heartbeat message 702 from the device, if no heartbeat message 702 is detected during a heartbeat message time interval, then a positive determination is made that the device has been powered off.

Server 730 then sends a request message 708 to device owner 710 requesting that they power on device 720 within a predetermined period of time. Device owner 710 then takes an action or sends a message 709 which causes device 720 to power on. Device 720 then powers on and begins issuing heartbeat messages 710. Then at 711 server 730 makes a determination as to whether device 720 has been powered on by detecting at least one heartbeat message 710. Such a determination is sought in a time window from when the request 709 is expected to be delivered to device owner 710, the time window having a duration of the predetermined period of time given in message 708, plus an expected start-up time of device 720. If the determination is positive, then device 720 is positively authenticated, connected to the user's user account for the service, and at 712 a 'device added' message is sent from server 730 to device owner 710.

Figure 8:
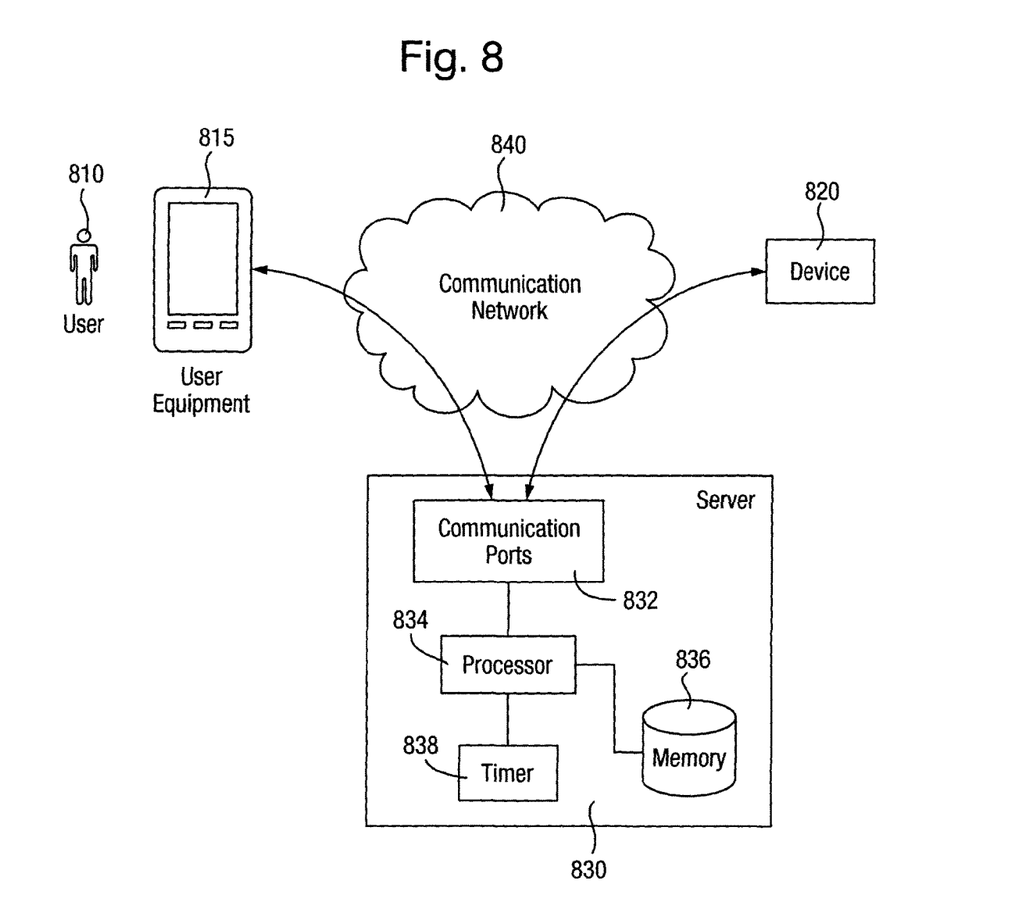
FIG. 8 illustrates an apparatus for implementing the methods described herein.

FIG. 8 illustrates an apparatus for implementing the methods described herein. A user 810 has a user equipment 815, in this case a smartphone which is arranged to communicate via a communications network 840 with a server 830. User 810 also has physical access to device 820 which in turn is also arranged to communicate over a communication network 840 with server 830. Server 830 hosts a service which provides the user 810 with a user interface to interact with device 820. This service could, for example, be Facebook™. The communication network 840 may be the internet. The device 820 may connect to the communication network 840 by a wireless communications network, or a wired communications link.

Server 830 comprises a communication port 832, a processor 834, a memory 836, and a timer 838. Communication port 832 allows server 830 to communicate via the communication network 840 with the user equipment 815 and the device 820. Server 830 further comprises a processor 834 arranged to receive information from and send information to communications port 832. The processor 834 is arranged to receive instructions which, when executed, causes the processor 834 to carry out the above described method. The instructions may be stored on a memory 836. Processor 834 may further retrieve from memory 836 data such as links associating a particular user equipment with a particular device. Processor 834 is further arranged to communicate with a timer 838 which is used to check that actions are performed by user 810 within predetermined time periods.

MSISDN is used as an example herein, it should be noted that there are ways for connecting devices to an internet service other than a wireless communications network, and as such other ID codes may be used such as a MAC address. The ID code may even comprise a proprietary code displayed on the device and issued by the device manufacturer. The ID code may be issued by a body certified to uniquely identify devices.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope

The invention claimed is:

1. A method for authenticating user equipment access to a device over a communications network, the method comprising:
   sending a first message to the user equipment, the first message requesting a human user of the user equipment to power off the device;
   after sending the first message, detecting that the device is not available;
   after sending the first message, sending a second message to the user equipment, the second message requesting that the user power on the device;
   after sending the second message, detecting that the device is available; and
   authenticating user equipment access to the device as a result of the detection of the unavailability of the device followed by the detection of the availability of the device, wherein
   the device is configured such that after the device is powered on, the device transmits a heartbeat message,
   the step of detecting that the device is not available comprises determining that no heartbeat messages from the device have been received within a heartbeat time interval, and
   the step of detecting that the device is available comprises determining that a heartbeat message from the device was received after the second message was sent to the user equipment.

2. The method of claim 1, wherein the method is performed in a server, and the server is arranged to provide a service to the user via the user equipment.

3. The method of claim 1, wherein user equipment access to the device comprises allowing the user equipment to access the device hardware.

4. The method of claim 1, the method further comprising authenticating a user account, and authenticating the user account access to the device.

5. The method of claim 1, wherein the first message includes information identifying a time period and the first message requests that the user power off the device within the identified time period.

6. The method of claim 1, wherein the second message includes information identifying a time period and the second message requests that the user power on the device within the identified time period.

7. The method of claim 5, further comprising
   determining that the first time period has elapsed, and as a result of detecting that the first time period has elapsed, determining whether the device is available.

8. A server for authenticating user equipment access to a device, the server comprising a processor and at least one communication port, the processor arranged to send and receive communications via the at least one communication port, and wherein the processor is arranged to:

send a first message to the user equipment, the first message requesting a human user of the user equipment to power off the device;

detect that the device is not available after sending the first message;

send a second message to the user equipment after sending the first message, the second message requesting that the user power on the device;

detect that the device is available; and authenticate the user equipment access to the device as a result of the detection of the unavailability of the device followed by the detection of the availability of the device, wherein the device is configured such that after the device is powered on, the device transmits a heartbeat message, the processor is arranged to detect that the device is not available by determining that no heartbeat messages from the device have been received within a heartbeat time interval, and the processor is arranged to detect that the device is available by determining that a heartbeat message from the device was received after the second message was sent to the user equipment.

9. The server of claim 8, wherein the server is arranged to communicate with the user equipment via the at least one communications port.

10. The server of claim 8, wherein the server is arranged to provide a service to the user equipment.

11. The server of claim 10, wherein the service comprises retrieving information from the device and delivering the retrieved information, or a derivative of the information, to the user equipment.

12. The server of claim 8, wherein the server hosts at least one user account, the at least one user account accessible by a user via a user equipment.

13. The server of claim 8, the server further comprising a memory to store a record of an authenticated link between the user equipment and the device.

14. The server of claim 8, the server further comprising a timer, the timer used to determine whether the device is powered on or off within a particular time period.

15. A computer program product comprising a non-transitory computer-readable medium, carrying instructions, which, when executed by computer logic, causes said computer logic to carry out the method of claim 1.

* * * * *